United States Patent
Tu et al.

(10) Patent No.: US 12,401,751 B2
(45) Date of Patent: Aug. 26, 2025

(54) SCANNER REDIRECTION PROCESSING METHOD INDEPENDENT OF DRIVER TYPE

(71) Applicant: Omnissa, LLC, Mountain View, CA (US)

(72) Inventors: Zhongzheng Tu, Beijing (CN); Huiyong Huo, Beijing (CN); Mingsheng Zang, Beijing (CN); Kai Xiang, Beijing (CN); Ning Ge, Beijing (CN); Tao Jin, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 95 days.

(21) Appl. No.: 18/452,468

(22) Filed: Aug. 18, 2023

(65) Prior Publication Data

US 2025/0008029 A1    Jan. 2, 2025

(30) Foreign Application Priority Data

Jun. 30, 2023   (WO) ................ PCT/CN2023/104479

(51) Int. Cl.
*H04N 1/00*     (2006.01)
*G06F 9/451*     (2018.01)
*H04N 23/66*     (2023.01)

(52) U.S. Cl.
CPC ......... *H04N 1/00209* (2013.01); *G06F 9/452* (2018.02); *H04N 23/66* (2023.01)

(58) Field of Classification Search
CPC ..... H04N 1/00209; H04N 23/66; G06F 9/452
See application file for complete search history.

(56) References Cited

U.S. PATENT DOCUMENTS

| | | | |
|---|---|---|---|
| 10,230,855 B1* | 3/2019 | Sarreo | H04N 1/0464 |
| 2008/0201485 A1* | 8/2008 | Patwardhan | H04L 9/40 |
| | | | 709/238 |
| 2024/0205357 A1* | 6/2024 | Huo | H04N 5/2621 |
| 2025/0008030 A1* | 1/2025 | Tu | H04N 1/00209 |
| 2025/0036446 A1* | 1/2025 | Tu | G06F 9/45558 |
| 2025/0080663 A1* | 3/2025 | Huo | H04N 1/32101 |

OTHER PUBLICATIONS

"Document Scanner—TWAIN, WIA, ISIS or SANE," Jan. 7, 2020, Dynamsoft, 5 pages, https://www.dynamsoft.com/blog/insights/document-scanning-twain-wia-isis-sane.

* cited by examiner

*Primary Examiner* — Shahbaz Nazrul
(74) *Attorney, Agent, or Firm* — Kim & Stewart LLP (57) ABSTRACT

A scanner redirection method for a remote desktop computer system that includes a client computer and a remote computer, includes the steps of: receiving a request from an application installed on the remote computer to acquire an image from an image capturing device using a driver selected for communicating with the image capturing device; selecting a scanner redirection process based on a selection of the driver and loading the scanner redirection process, which is to be used in communicating with the selected driver, wherein said selecting includes selecting an m-bit scanner redirection process in response to the selected driver being an m-bit driver or selecting an n-bit scanner redirection process in response to the selected driver being an n-bit driver, where m is not equal to n; and upon acquiring the image using the selected scanner redirection process and the selected driver, transmitting the image to the application.

20 Claims, 9 Drawing Sheets

SCANNER REDIRECTION PROCESSING METHOD INDEPENDENT OF DRIVER TYPE

CROSS-REFERENCE

This application is based upon and claims the benefit of priority from International Patent Application No. PCT/CN2023/104479, filed on Jun. 30, 2023, the entire contents of which are incorporated herein by reference.

BACKGROUND

Many organizations rely on remote desktop (RD) services to provide lean, flexible computing environments. RD scanning is one important feature required by the end user of an RD service. Through RD scanning, an application executing on a remote (agent) computer such as a server acquires images from client-side image capturing devices (ICDs) such as scanners or digital cameras. Specifically, through scanner redirection, the remote computer transmits a request to a client computer such as a laptop for one or more images, the client computer being connected to an ICD. The client computer then acquires the image(s) from the ICD and transmits them to the remote computer.

To implement RD scanning, RD scanning software is installed at both the remote and client computers. The RD scanning software installed at the client computer communicates with drivers that control ICDs. However, the RD scanning software is limited to communicating with drivers that have the same bit-length properties as the RD scanning software. For example, if the RD scanning software executes as a 64-bit process, then it can only communicate with 64-bit drivers. Meanwhile, the client computer may only have a 32-bit driver installed for a particular ICD. This may be because the manufacturer of the ICD has not released a 64-bit driver or because a user of the client computer either intentionally or unintentionally downloaded the 32-bit driver instead of an available 64-bit driver. In any case, the ICD is unavailable in such circumstances for RD scanning. A solution is thus desirable for providing RD scanning in a way that is flexible with varying bit-length properties of drivers.

SUMMARY

One or more embodiments provide a scanner redirection method for an RD computer system. The RD computer system includes a client computer and a remote computer, and the client computer and the remote computer are each configured to execute RD software. The scanner redirection method includes the steps of: receiving a request from an application installed on the remote computer to acquire an image from an image capturing device using a driver that has been selected for communicating with the image capturing device; selecting a scanner redirection process based on a selection of the driver and loading the scanner redirection process, which is to be used in communicating with the selected driver to acquire the image from the image capturing device, wherein said selecting includes selecting an m-bit scanner redirection process in response to the selected driver being an m-bit driver or selecting an n-bit scanner redirection process in response to the selected driver being an n-bit driver, where m is not equal to n; and upon acquiring the image using the selected scanner redirection process and the selected driver, transmitting the image to the application.

Further embodiments include a non-transitory computer-readable storage medium comprising instructions that cause an RD computer system to carry out the above scanner redirection method, as well as an RD computer system configured to carry out the above scanner redirection method.

BRIEF DESCRIPTION OF THE DRAWINGS

FIGS. 4A-4B are block diagrams illustrating examples of creating a list of ICDs to select from.

DETAILED DESCRIPTION

Techniques are described for realizing scanner redirection during an RD session between a client computer and a remote computer. A VM running in the remote computer executes applications that consume images from ICDs. The ICDs are connected to the client computer. To acquire the images, the applications of the remote computer request the images from an application of the client computer, referred to as an RD client application. The RD client application acquires the images from the ICD and transmits them to the applications of the remote computer.

According to embodiments, the RD client application and the applications of the remote computer utilize the same scanning protocol such as the TWAIN protocol. Pursuant to the common scanning protocol, the RD client application and the applications of the remote computer utilize "data source managers" and "data sources." For each of the applications of the remote computer, the data source manager communicates with a "virtual" data source that requests images from the client computer. For the RD client application, there are two data source managers, each communicating with data sources to acquire images from ICDs.

In particular, at the RD client application, a 32-bit data source manager communicates with 32-bit data sources. The 32-bit data sources are configured to communicate with 32-bit drivers to control ICDs. Additionally, at the RD client application, a 64-bit data source manager communicates with 64-bit data sources. The 64-bit data sources are configured to communicate with 64-bit drivers to control ICDs. Accordingly, because the RD client application includes both 32-bit and 64-bit data sources, the RD client application is able to communicate with 32-bit and 64-bit drivers for scanner redirection. These and further aspects of the invention are discussed below with respect to the drawings.

Figure 1:
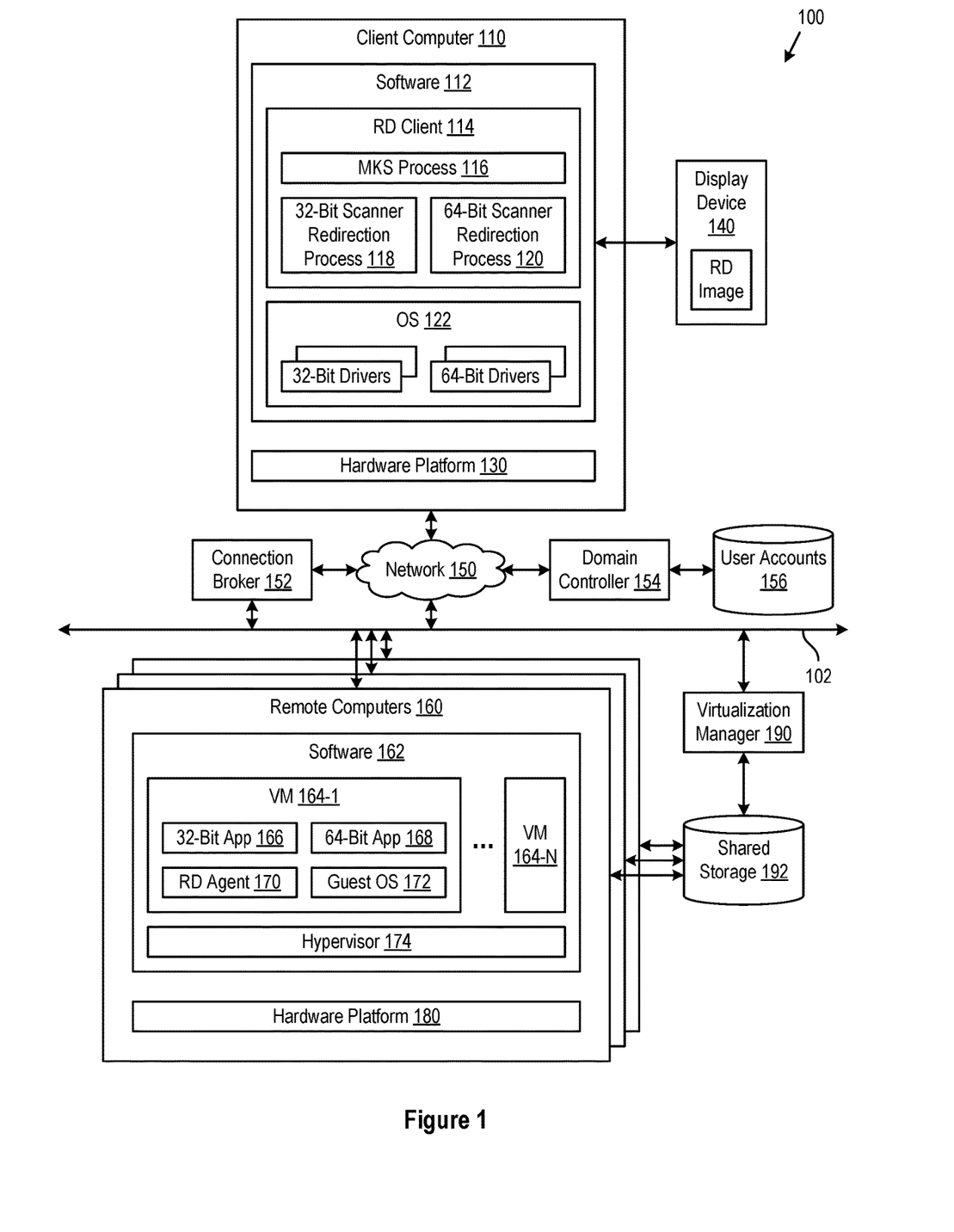
FIG. 1 is a block diagram of an RD computer system in which embodiments may be implemented.

FIG. 1 is a block diagram of an RD computer system 100 in which embodiments may be implemented. RD computer system 100 includes a client computer 110 and a plurality of remote (agent) computers 160 (remote from client computer 110). For example, client computer 110 may be a laptop, a desktop computer, or a server in a private data center controlled by a particular organization. Remote computers 160 may be servers provisioned in a private data center controlled by the particular organization or provisioned in a public data center that includes servers of other organizations.

Client computer 110 is constructed on a hardware platform 130 such as an x86 architecture platform. Hardware platform 130 includes conventional components of a computing device (not shown), such as one or more central processing units (CPUs), memory such as random-access memory (RAM), local storage such as one or more magnetic drives or solid-state drives (SSDs), and one or more network interface cards (NICs). The CPU(s) are configured to execute instructions such as executable instructions that perform one or more operations described herein, which may be stored in the memory. The NIC(s) enable client computer 110 to communicate with remote computers 160 over a network 150 such as the Internet.

Hardware platform 130 supports software 112, which includes an RD client application 114 running on a commodity operating system (OS) 122. For example, RD client 114 may be VMware Horizon® Client, available from VMware, Inc. The term "desktop" in remote desktop (RD) refers to an instance of an interactive environment provided by an OS and software applications, typically in the form of display and sound output and keyboard and mouse input. Through RD client 114, the user accesses an RD from any location. RD client 114 includes a mouse, keyboard, screen (MKS) process 116, a 32-bit scanner redirection process 118, and a 64-bit scanner redirection process 120. One of remote computers 160 transmits an image of the RD to MKS process 116. RD client 114 then communicates with a display device 140 such as a monitor on which the user views the RD image.

When the user performs actions in the RD such as clicking a mouse or typing on a keyboard, the user's actions are received by MKS process 116. MKS process 116 transmits the user's actions to one of remote computers 160 to update the user's RD accordingly. 32-bit scanner redirection process 118 acquires images from one of more ICDs (not shown in FIG. 1) connected to client computer 110. To do so, 32-bit scanner redirection process 118 communicates with 32-bit drivers of OS 122 to control such ICDs. Similarly, 64-bit scanner redirection process 120 acquires images from one or more ICDs via 64-bit drivers of OS 122. Images acquired from the ICDs are transmitted to remote computer 160.

RD computer system 100 includes a domain controller 154 such as Microsoft Active Directory.® Domain controller 154 manages user accounts 156, which include the user's log-in information for the RD session. RD computer system 100 also includes a connection broker 152 that manages connections between client computer 110 and remote computers 160. Connection broker 152 and domain controller 154 may be, e.g., physical servers or VMs running on the same server or different servers.

In embodiments illustrated herein, RDs are running in VMs 164. VMs 164 are instantiated on remote computers 160, each of remote computers 160 including software 162 and a hardware platform 180. Hardware platform 180 is, e.g., an x86 architecture platform including the conventional components of a computer described above for hardware platform 130. Hardware platform 180 of each of remote computers 160 is coupled to a shared persistent storage system 192.

Software 162 includes a hypervisor 174, which is a virtualization software layer that supports a VM execution space within which VMs 164 are concurrently instantiated and executed. One example of hypervisor 174 is a VMware ESX® hypervisor, available from VMware, Inc. VM 164-1, which is one of VMs 164, includes a 32-bit application 166, a 64-bit application 168, and an RD agent application 170. 32-bit application 166, 64-bit application 168, and RD agent 170 run on a commodity guest OS 172.

RD agent 170 communicates with RD client 114 to establish the RD session for the user. As part of the RD session, RD agent 170 periodically transmits an updated RD image to RD client 114 to be displayed on display device 140. RD client 114 and RD agent 170 are also referred to individually and collectively herein as RD software. 32-bit application 166 and 64-bit application 168 each consume images created by the ICDs connected to client computer 110. To do so, 32-bit application 166 and 64-bit application 168 have each been modified to handle scanner redirection with RD client 114. For example, 32-bit application 166 or 64-bit application 168 may be Adobe® Photoshop,® which the user accesses through the RD session.

Remote computers 160 are managed by a virtualization manager 190. Virtualization manager 190 logically groups remote computers 160 into a cluster to perform cluster-level tasks such as provisioning and managing VMs 164 and migrating VMs 164 from one of remote computers 160 to another. Virtualization manager 190 communicates with remote computers 160 via a management network (not shown), which is provisioned from a network 102 such as a local area network (LAN). Virtualization manager 190 may be, e.g., a physical server or one of VMs 164. One example of virtualization manager 190 is VMware vCenter Server,® available from VMware, Inc. A particular configuration of RD computer system 100 is illustrated in FIG. 1, but it should be recognized that one or more embodiments may be practiced with other computer system configurations.

Figure 2:
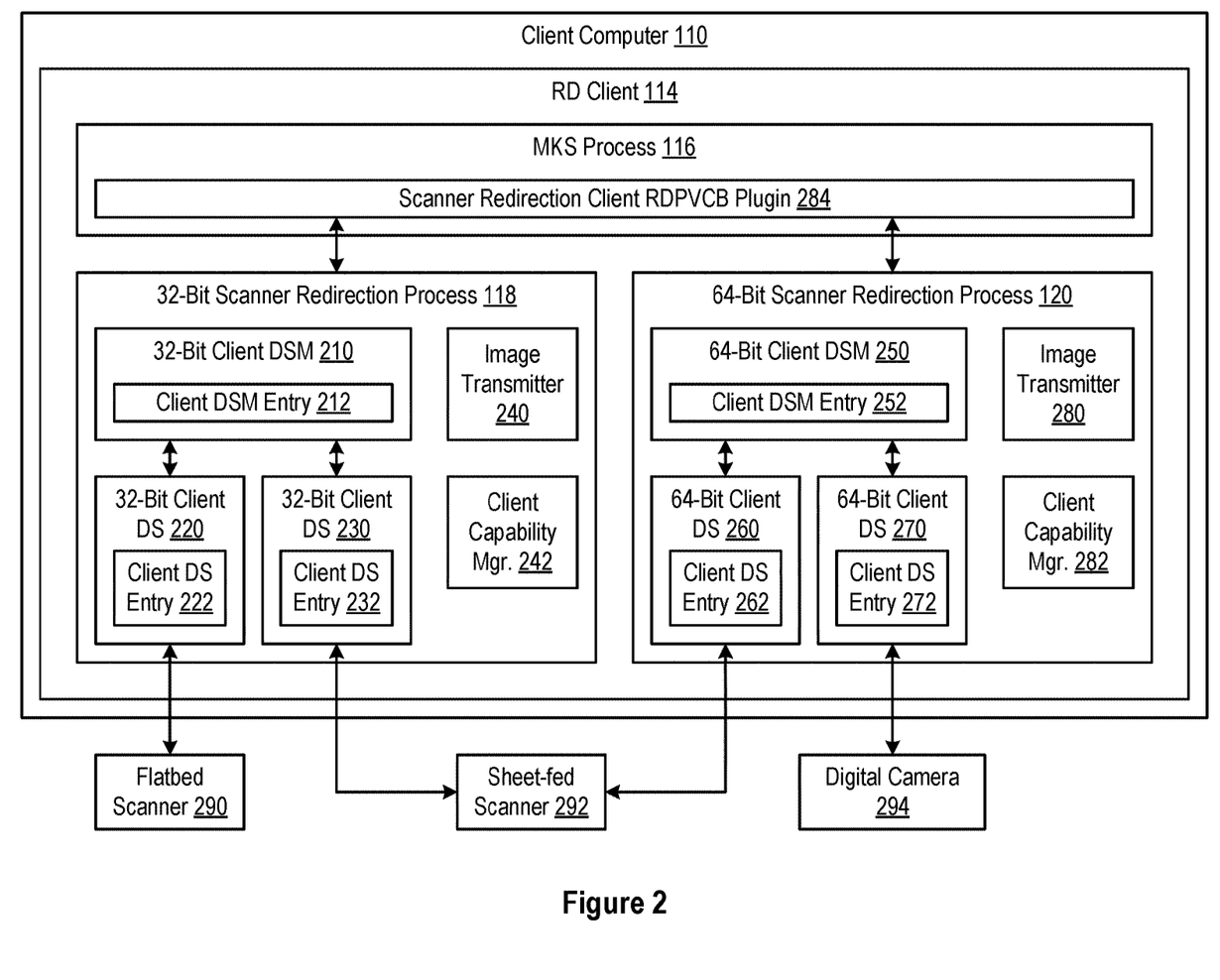
FIG. 2 is a block diagram of a client computer of the RD computer system and a group of ICDs connected to the client computer.

FIG. 2 is a block diagram of client computer 110 and a group of ICDs connected to client computer 110, the ICDs including a flatbed scanner 290, a sheet-fed scanner 292, and a digital camera 294. In the example of FIG. 2, there are four relevant drivers installed for controlling the depicted ICDs. There are two 32-bit drivers, one for controlling flatbed scanner 290 and another for controlling sheet-fed scanner 292. There are also two 64-bit drivers, one for controlling sheet-fed scanner 292 and another for controlling digital camera 294.

In the case of flatbed scanner 290, the corresponding 32-bit driver communicates with 32-bit scanner redirection process 118. In the case of digital camera 294, the corresponding 64-bit driver communicates with 64-bit scanner redirection process 120. In the case of sheet-fed scanner 292, either the corresponding 32-bit driver may communicate with 32-bit scanner redirection process 118, or the corresponding 64-bit driver communicates with 64-bit scanner redirection process 120. For example, by default, client computer 110 may prioritize using 32-bit drivers over 64-bit drivers, in which case the corresponding 32-bit driver is used for controlling sheet-fed scanner 292. On the other hand, if the user specifies to prioritize using 64-bit drivers, the corresponding 64-bit driver is used for controlling sheet-fed scanner 292.

MKS process 116 includes a scanner redirection client remote desktop protocol virtual channel bridge (RDPVCB) plugin 284, referred to herein as client RDPVCB plugin 284. Client RDPVCB plugin 284 is communication software that is configured to communicate with VM 164-1 via transmission control protocol (TCP) or user datagram protocol (UDP) channels. Such channels are established between client RDPVCB plugin 284 and VM 164-1. Client RDPVCB plugin 284 is also configured to communicate with both 32-bit scanner redirection process 118 and 64-bit scanner redirection process 120. 32-bit scanner redirection process 118 and 64-bit scanner redirection process 120 include a 32-bit client data source manager (DSM) 210 and a 64-bit client DSM 250, respectively. 32-bit client DSM 210 and 64-bit client DSM 250 communicate with data sources (DSs) to acquire images from ICDs.

In the example of FIG. 2, 32-bit client DSM 210 communicates with 32-bit client DSs 220 and 230. 32-bit client DS 220 communicates with one 32-bit driver to control flatbed scanner 290, and 32-bit client DS 230 communicates with another 32-bit driver to control sheet-fed scanner 292. 64-bit client DSM 250 communicates with 64-bit client DSs 260 and 270. 64-bit client DS 260 communicates with one 64-bit driver to control sheet-fed scanner 292, and 64-bit client DS 270 communicates with another 64-bit driver to control digital camera 294.

To communicate with ICDs, 32-bit scanner redirection process 118 calls a "client DSM entry" function 212 to provide commands to 32-bit client DSM 210. 32-bit client DSM 210 then calls a "client DS entry" function 222 or 232 to transmit commands to 32-bit client DS 220 or 230, respectively. The relevant 32-bit client DS then returns results to 32-bit client DSM 210 via return values of the client DS entry call. Similarly, 32-bit client DSM 210 returns results to 32-bit scanner redirection process 118 via client DSM entry 212 return values.

When one of the 32-bit client DSs acquires an image from a corresponding ICD, 32-bit scanner redirection process 118 instructs an image transmitter 240 to transmit the image to VM 164-1 via client RDPVCB plugin 284. Additionally, one of the 32-bit client DSs may acquire capabilities from a corresponding ICD such as different supported resolutions for acquired images. 32-bit scanner redirection process 118 instructs a client capability manager 242 to transmit the capabilities to VM 164-1 via client RDPVCB plugin 284. If the user specifies to adjust settings for a particular ICD using a 32-bit driver, 32-bit scanner redirection process 118 instructs the corresponding 32-bit client DS via client DSM 210 to control the ICD to adjust those settings.

Similar to 32-bit scanner redirection process 118, to communicate with ICDs, 64-bit scanner redirection process 120 calls a "client DSM entry" function 252 to provide commands to 64-bit client DSM 250. 64-bit client DSM 250 then calls a "client DS entry" function 262 or 272 to transmit commands to 64-bit client DS 260 or 270, respectively. The relevant 64-bit client DS then returns results to 64-bit client DSM 250 via return values of the client DS entry call. Similarly, 64-bit client DSM 250 returns results to 64-bit scanner redirection process 120 via client DSM entry 252 return values.

When one of the 64-bit client DSs acquires an image from a corresponding ICD, 64-bit scanner redirection process 120 instructs an image transmitter 280 to transmit the image to VM 164-1 via client RDPVCB plugin 284. Additionally, one of the 64-bit client DSs may acquire capabilities from a corresponding ICD such as different supported resolutions for acquired images. 64-bit scanner redirection process 120 instructs a client capability manager 282 to transmit the capabilities to VM 164-1 via client RDPVCB plugin 284. If the user specifies to adjust settings for a particular ICD using a 64-bit driver, 64-bit scanner redirection process 120 instructs the corresponding 64-bit client DS via client DSM 250 to control the ICD to adjust those settings.

Figure 3:
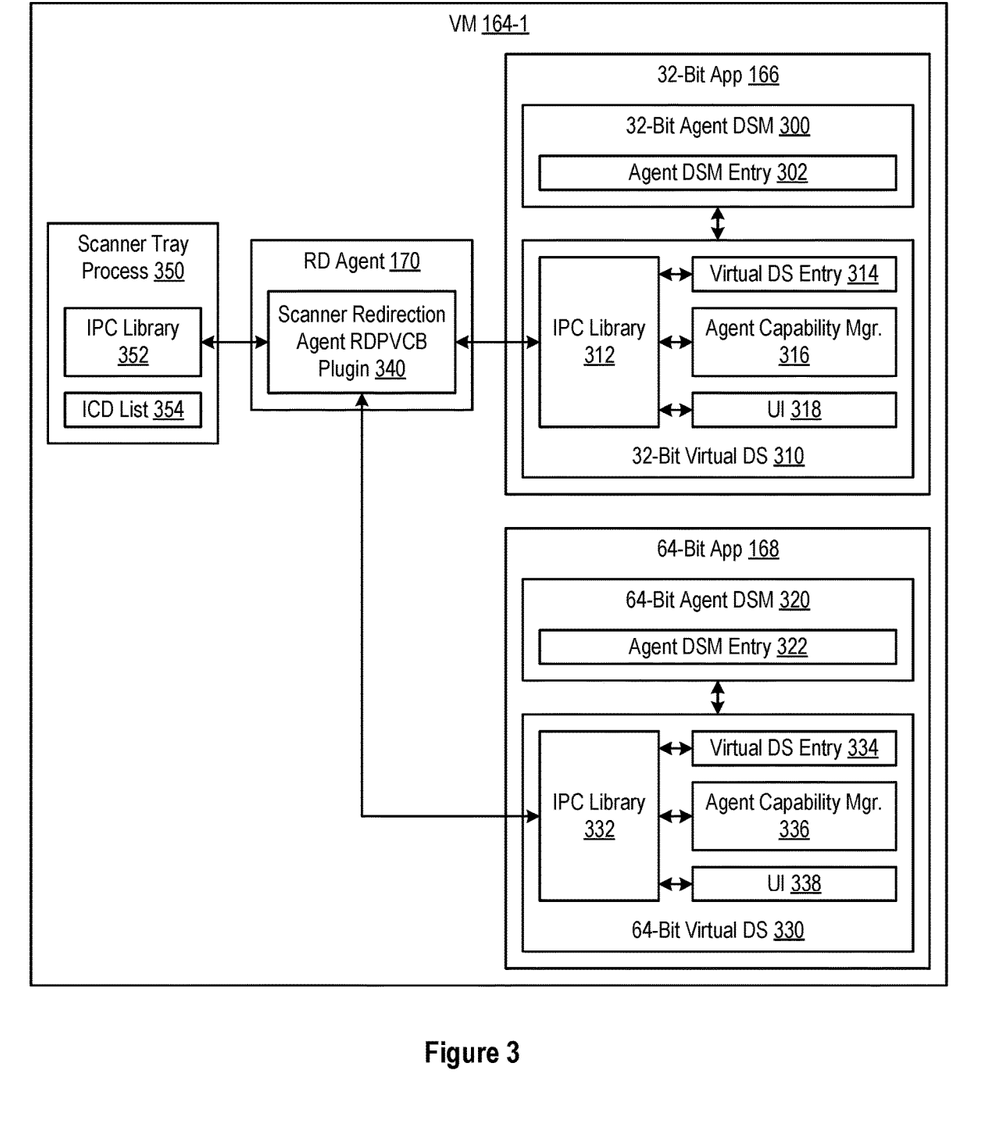
FIG. 3 is a block diagram of a virtual machine of a remote computer of the RD computer system.

FIG. 3 is a block diagram of VM 164-1, which includes 32-bit application 166, 64-bit application 168, RD agent 170, and a scanner tray process 150. RD agent 170 includes a scanner redirection agent RDPVCB plugin 340, referred to herein as agent RDPVCB plugin 340. Agent RDPVCB plugin 340 is communication software that is configured to communicate with client computer 110 via TCP or UDP channels. Those channels are established between client RDPVCB plugin 284 and agent RDPVCB plugin 340 to facilitate communications between client computer 110 and VM 164-1. Agent RDPVCB plugin 340 is also configured to communicate with scanner tray process 350, 32-bit application 166, and 64-bit application 168.

Scanner tray process 350 is used for selecting an ICD connected to client computer 110 for scanner redirection functionalities. Scanner tray process 350 includes an inter-process communication (IPC) library 352, which facilitates communications with agent RDPVCB plugin 340. Scanner tray process 350 also includes an ICD list 354, which is a list of ICDs for which drivers have been installed in client computer 110. For example, to interact with scanner tray process 350, the user may click a toolbar menu item of VM 164-1, which results in scanner tray process 350 showing the contents of ICD list 354. The user may then click on a name of an ICD to select that ICD. Then, future requests from VM 164-1, e.g., to adjust settings of an ICD or to acquire images using the ICD, specify the selected ICD as the target of the request.

32-bit application 166 includes a 32-bit agent DSM 300 that communicates with a 32-bit virtual DS 310. Instead of communicating directly with an ICD, 32-bit virtual DS 310 communicates with client computer 110, e.g., to request images. Specifically, 32-bit application 166 calls an "agent DSM entry" function 302 to transmit commands to 32-bit agent DSM 300. 32-bit agent DSM 300 then calls a "virtual DS entry" function 314 to transmit commands to 32-bit virtual DS 310. 32-bit virtual DS 310 also returns results to 32-bit agent DSM 300 via return values of virtual DS entry 314 calls. Similarly, 32-bit agent DSM 300 returns results via agent DSM entry 302 return values.

In addition to virtual DS entry 314, 32-bit virtual DS 310 includes an IPC library 312, an agent capability manager 316, and a user interface (UI) 318. IPC library 312 facilitates communications between agent RDPVCB plugin 340, virtual DS entry 314, agent capability manager 316, and UI 318. Agent capability manager 316 caches capabilities of various ICDs such as different resolutions those ICDs can acquire images at, those capabilities being received from client capability manager 242 or 282 of client computer 110. Agent capability manager 316 transmits those capabilities to UI 318 to be displayed to the user. Then, via UI 318, the user adjusts various settings such as which resolutions to acquire images at. Agent capability manager 316 transmits specified adjustments to client computer 110 via agent RDPVCB plugin 340 to be applied to a selected ICD.

Through UI 318, the user also triggers the acquiring of one or more images by the selected ICD. Such requests are transmitted to client computer 110 via agent RDPVCB plugin 340, and then one or more images are received from client computer 110. Specifically, images are received by 32-bit virtual DS 310 via agent RDPVCB plugin 340. 32-bit virtual DS 310 then returns the images to 32-bit agent DSM 300 via virtual DS entry 314.

64-bit application 168 includes a 64-bit agent DSM 320 that communicates with a 64-bit virtual DS 330. Instead of communicating directly with an ICD, 64-bit virtual DS 330 communicates with client computer 110, e.g., to request images. Specifically, 64-bit application 168 calls an agent DSM entry function 322 to transmit commands to 64-bit agent DSM 320. 64-bit agent DSM 320 then calls a virtual DS entry function 334 to transmit commands to 64-bit virtual DS 330. 64-bit virtual DS 330 also returns results to 64-bit agent DSM 320 via return values of virtual DS entry 334 calls. Similarly, 64-bit agent DSM 320 returns results via agent DSM entry 322 return values.

In addition to virtual DS entry 334, 64-bit virtual DS 330 includes an IPC library 332, an agent capability manager 336, and a UI 338. IPC library 332 facilitates communications between agent RDPVCB plugin 340, virtual DS entry 334, agent capability manager 336, and UI 338. Agent capability manager 336 caches capabilities of various ICDs, those capabilities being received from client computer 110. Agent capability manager 336 transmits those capabilities to UI 338 to be displayed to the user. Then, via UI 338, the user adjusts various settings. Agent capability manager 336 transmits specified adjustments to client computer 110 via agent RDPVCB plugin 340 to be applied to a selected ICD.

Through UI 338, the user also triggers the acquiring of one or more images by the selected ICD. Such requests are transmitted to client computer 110 via agent RDPVCB plugin 340, and then one or more images are received from client computer 110. Specifically, images are received by 64-bit virtual DS 330 via agent RDPVCB plugin 340. 64-bit virtual DS 330 then returns the images to 64-bit agent DSM 320 via virtual DS entry 334.

It should be noted that the user may acquire images from the same ICDs via either 32-bit application 166 or 64-bit application 168. 32-bit application 166 may request images from any ICDs connected to client computer 110, regardless of whether a 32-bit driver is used by client computer 110 for communicating with the ICD or a 64-bit driver is used. The same can be said of 64-bit application 168. This is because regardless of which application of VM 164-1 is being used, the appropriate process of client computer 110 is loaded to control the selected ICD.

Figure 4A:
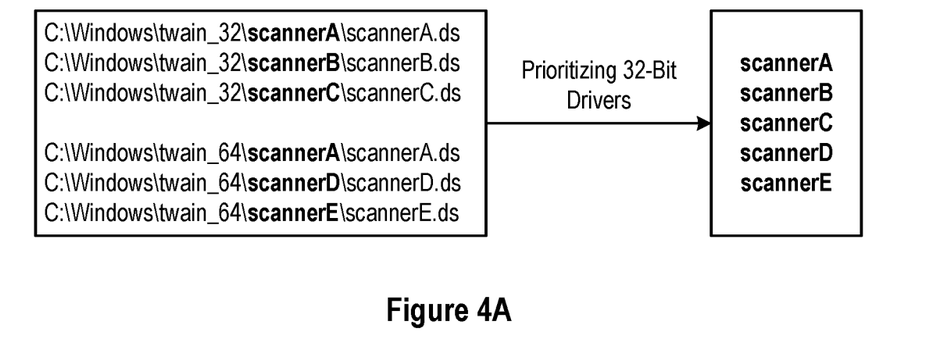
Figure 4B:
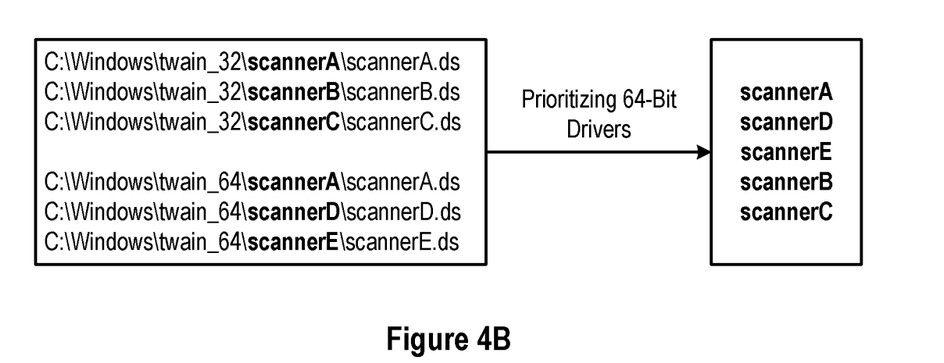

FIGS. 4A-4B are block diagrams illustrating examples of creating a list of ICDs for the user to select from. Such a list is created at client computer 110 upon the user launching an RD session. In particular, 32-bit scanner redirection process 118 retrieves file paths of 32-bit drivers installed in client computer 110, and 64-bit scanner redirection process 120 retrieves file paths of installed 64-bit drivers. The list of ICDs is then generated based on the retrieved file paths and transmitted to VM 164-1 to be stored in scanner tray process 350.

In the example of FIG. 4A, 32-bit scanner redirection process 118 retrieves file paths of three 32-bit drivers. Those file paths are "C:\Windows\twain_32\scannerA\scannerA.ds," "C:\Windows\twain_32\scannerB\scannerB.ds," and "C:\Windows\twain_32\scannerC\scannerC.ds," which are file paths of 32-bit drivers corresponding to ICDs named "scannerA," "scannerB," and "scannerC," respectively. 64-bit scanner redirection process 120 retrieves file paths of three 64-bit drivers. Those file paths are "C:\Windows\twain_64\scannerA\scannerA.ds," "C:\Windows\twain_64\scannerD\scannerD.ds," and "C:\Windows\twain_64\scannerE\scannerE.ds," which are file paths of 64-bit drivers corresponding to ICDs named "scannerA," "scannerD," and "scannerE," respectively.

In the example of FIG. 4A, the list of ICDs generated based on the retrieved driver names includes: "scannerA," then "scannerB," then "scannerC," then "scannerD," and then "scannerE." As can be seen, ICDs corresponding to 32-bit drivers are prioritized over ICDs corresponding to 64-bit drivers, e.g., by default. Additionally, the generated list does not include information about the bit-length properties of the corresponding drivers. It is intuitive for the user to select an ICD without concern for such bit-length properties, so such information is omitted from the list. Additionally, there is only one entry in the list per ICD regardless of whether there are multiple drivers installed for that ICD. This is why there is only one entry for scannerA despite there being both a 32-bit driver and 64-bit driver installed therefor.

In the example of FIG. 4B, the same drivers are installed at client computer 110. However, the list of ICDs generated based on the retrieved file paths includes: "scannerA," then "scannerD," then "scannerE," then "scannerB," and then "scannerC." As can be seen, ICDs corresponding to 64-bit drivers are prioritized over ICDs corresponding to 32-bit drivers. For example, the user may have set this priority by modifying a particular registry key of OS 122. Like the list of FIG. 4A, the list of FIG. 4B does not include information about bit-length properties, and there is only one entry in the list per ICD.

Figure 5:
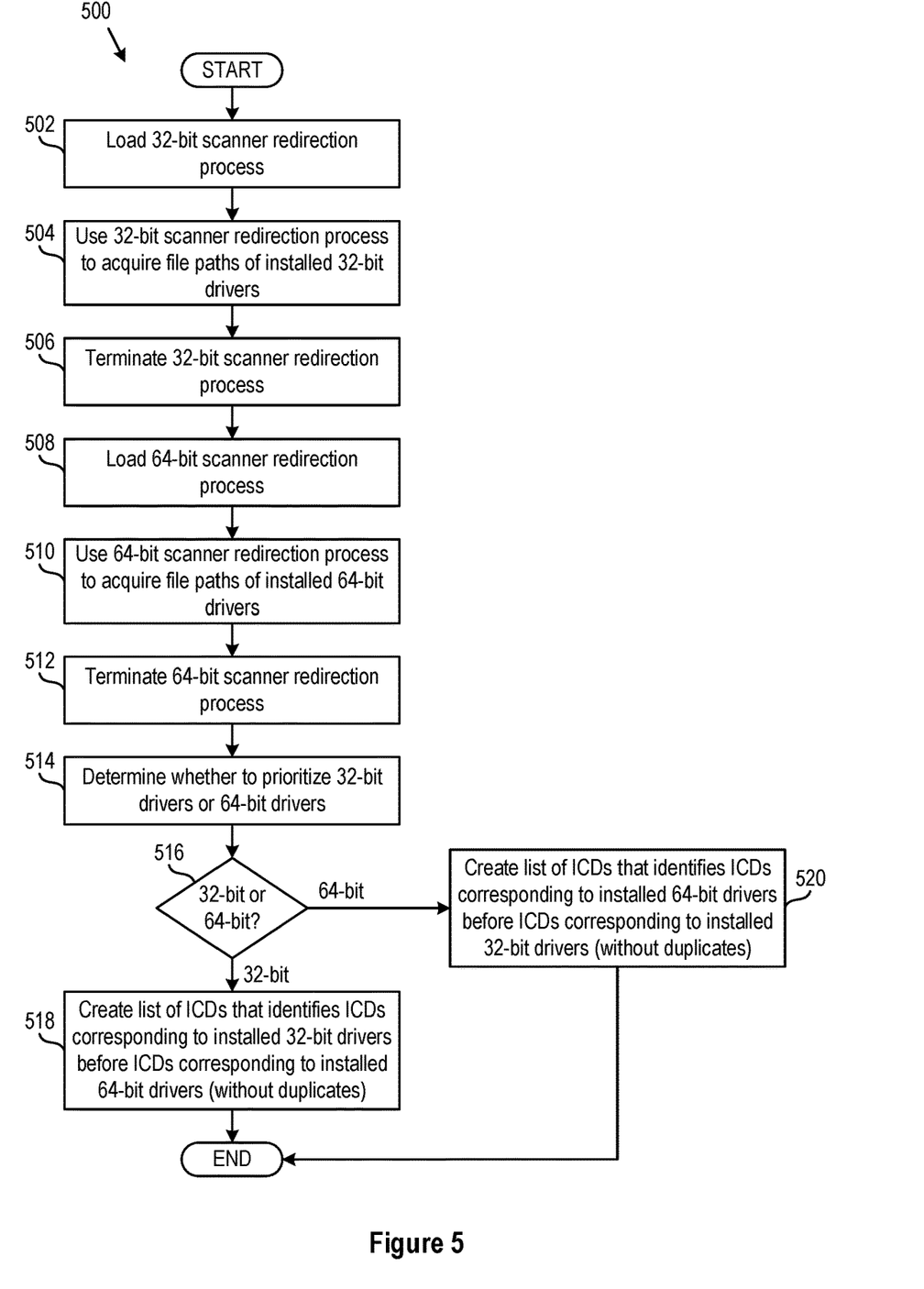
FIG. 5 is a flow diagram of a method performed by the client computer to create a list of ICDs, according to an embodiment.

FIG. 5 is a flow diagram of a method 500 performed by MKS process 116 of client computer 110 to create a list of ICDs, according to an embodiment. Method 500 is performed upon the user launching an RD session. At step 502, MKS process 116 loads 32-bit scanner redirection process 118 into memory of hardware platform 130. At step 504, MKS process 116 uses 32-bit scanner redirection process 118 to acquire file paths of installed 32-bit drivers. At step 506, MKS process 116 terminates 32-bit scanner redirection process 118.

At step 508, MKS process 116 loads 64-bit scanner redirection process 120 into memory of hardware platform 130. At step 510, MKS process 116 uses 64-bit scanner redirection process 120 to acquire file paths of installed 64-bit drivers. At step 512, MKS process 116 terminates 64-bit scanner redirection process 120. At step 514, MKS process 116 determines whether to prioritize using 32-bit drivers or 64-bit drivers. For example, MKS process 116 may check a registry key of OS 122 that indicates which to prioritize.

At step 516, if MKS process 116 determines to prioritize using 32-bit drivers, method 500 moves to step 518. At step 518, MKS process 116 creates a list of ICDs that identifies ICDs corresponding to installed 32-bit drivers before ICDs corresponding to installed 64-bit drivers. As mentioned earlier, for any ICD corresponding to both 32-bit and 64-bit drivers, the list only identifies that ICD once. After step 518, method 500 ends.

Returning to step 516, if MKS process 116 determines to prioritize using 64-bit drivers, method 500 moves to step 520. At step 520, MKS process 116 creates a list of ICDs that identifies ICDs corresponding to installed 64-bit drivers before ICDs corresponding to installed 32-bit drivers. For any ICD corresponding to both, the list only identifies that ICD once. After step 520, method 500 ends.

Figure 6:
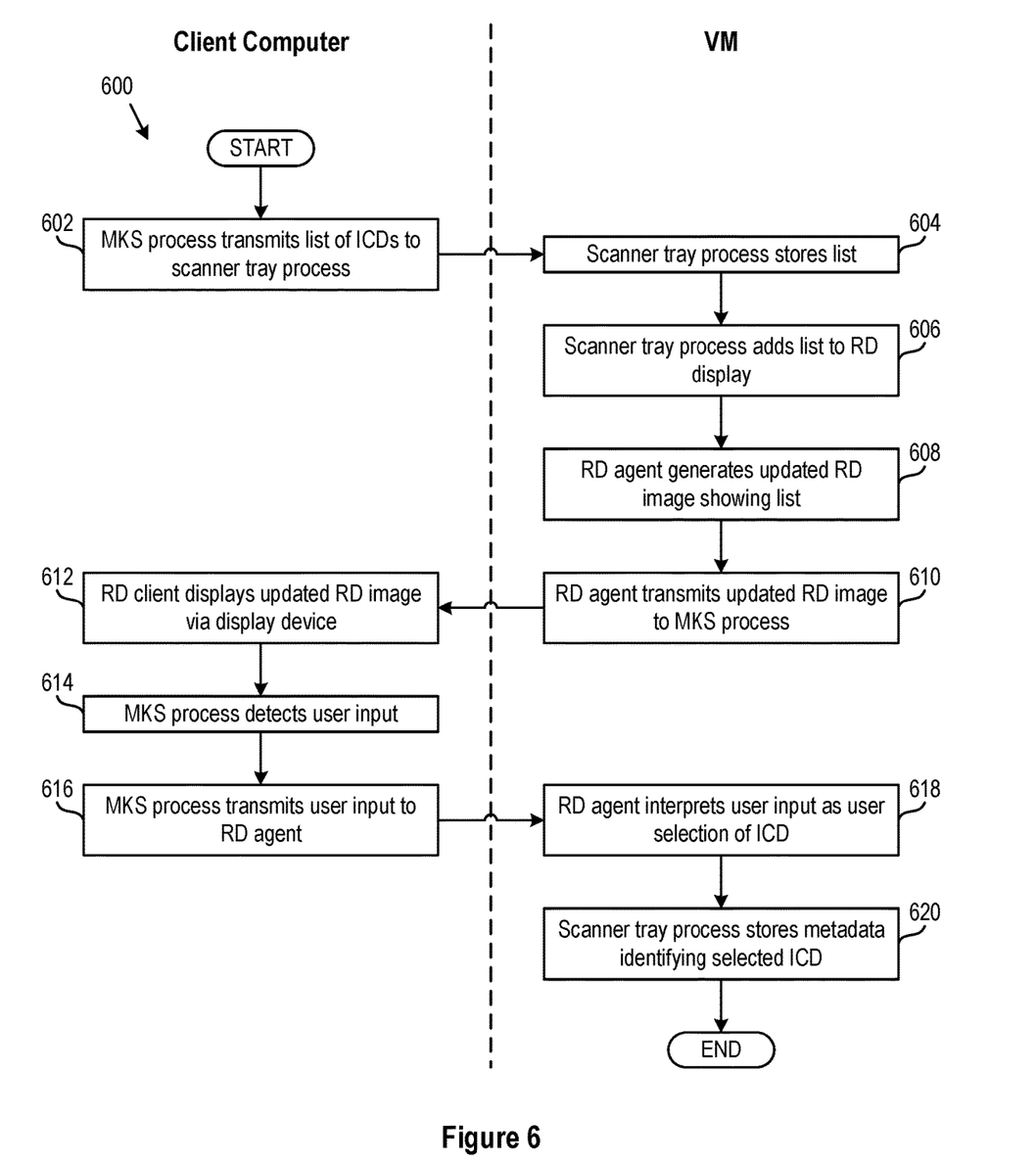
FIG. 6 is a flow diagram of a method performed by the client computer and the virtual machine of the remote computer to select an ICD for RD scanning functionalities, according to an embodiment.

FIG. 6 is a flow diagram of a method 600 performed by client computer 110 and VM 164-1 to select an ICD for RD scanning functionalities, according to an embodiment. At step 602, MKS process 116 transmits a list of ICDs to scanner tray process 350 via a TCP or UDP channel between client RDPVCB plugin 284 and agent RDPVCB plugin 340. At step 604, scanner tray process 350 stores the list. At step 606, scanner tray process 350 adds the list to the RD display, e.g., in response to the user clicking a corresponding toolbar menu item. At step 608, RD agent 170 generates an updated RD image, which shows the list added to the RD display by scanner tray process 350. At step 610, RD agent 170 transmits the updated RD image to MKS process 116 via the TCP or UDP channel.

At step 612, RD client 114 displays the RD image via display device 140. At step 614, MKS process 116 detects user input, e.g., the user clicking a mouse. At step 616, MKS process 116 transmits the user input to RD agent 170. At step 618, RD agent 170 interprets the user input as user selection of one of the ICDs of the list. At step 620, scanner tray process 350 stores metadata identifying the selected ICD. After step 620, method 600 ends.

Figure 7:
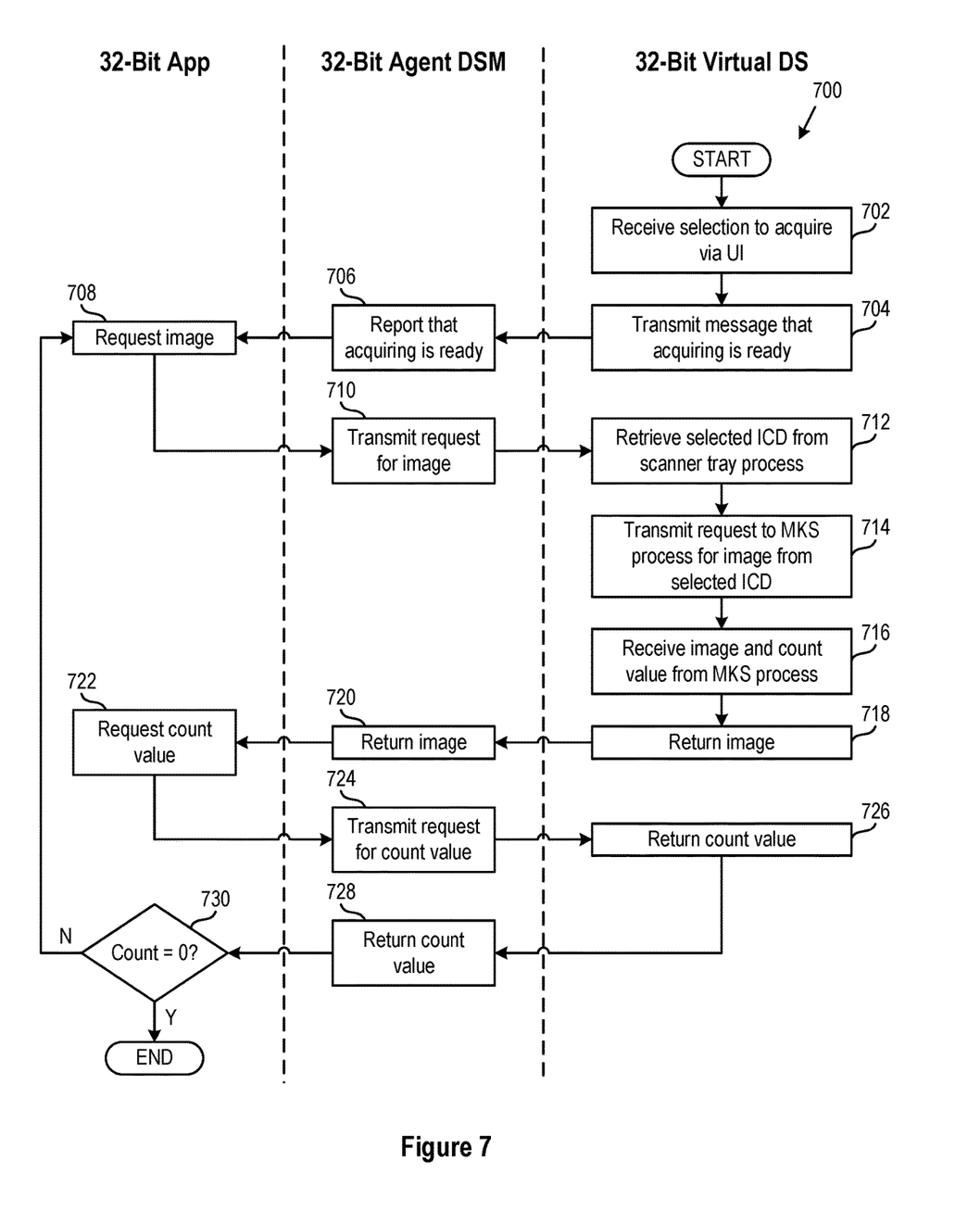
FIG. 7 is a flow diagram of a method performed by the remote computer to acquire one or more images through RD scanning, according to an embodiment.

FIG. 7 is a flow diagram of a method 700 performed by VM 164-1 to acquire one or more images through RD scanning, according to an embodiment. Method 700 is discussed with respect to 32-bit application 166. However, method 700 is instead performed by 64-bit application 168 if the user is requesting one or more images using 64-bit application 168. If performed by 64-bit application 168, steps performed by 32-bit application 166, 32-bit agent DSM 300, and 32-bit virtual DS 310 are instead performed by 64-bit application 168, 64-bit agent DSM 320, and 64-bit virtual DS 330, respectively.

At step 702, 32-bit virtual DS 310 receives a selection via UI 318 to acquire an image. For example, the user may click an "acquire" button of UI 318 to trigger the selection. At step 704, 32-bit virtual DS 310 transmits a message to 32-bit agent DSM 300 indicating that acquiring is ready. At step 706, 32-bit agent DSM 300 reports to 32-bit application 166 that acquiring is ready. At step 708, 32-bit application 166 calls agent DSM entry 302 to request an image from 32-bit agent DSM 300.

At step 710, 32-bit agent DSM 300 calls virtual DS entry 314 to transmit a request to 32-bit virtual DS 310 for the image. At step 712, 32-bit virtual DS 310 retrieves the selected ICD from scanner tray process 350. Specifically, scanner tray process 350 locates metadata indicating the name of the selected ICD and transmits the name to 32-bit virtual DS 310. At step 714, 32-bit virtual DS 310 transmits a request to MKS process 116 via a TCP or UDP channel between client RDPVCB plugin 284 and agent RDPVCB plugin 340. The request is for an image from the selected ICD, the request including the name of the ICD. Step 714 triggers the method of FIG. 8, as discussed further below.

At step 716, 32-bit virtual DS 310 receives the image and a "count" value from MKS process 116 via the TCP or UDP channel. Count is a variable indicating whether there are any pending images yet to be acquired from the selected ICD. A count value of zero indicates that there are no pending images. A nonzero value indicates that there is at least one pending image.

At step 718, 32-bit virtual DS 310 transmits the image to 32-bit agent DSM 300 as a return value of the call to virtual DS entry 314. At step 720, 32-bit agent DSM 300 provides the image to 32-bit application 166 as a return value of the call to agent DSM entry 302. At step 722, 32-bit application 166 calls agent DSM entry 302 to request 32-bit agent DSM 300 for the count value. At step 724, 32-bit agent DSM 300 calls virtual DS entry 314 to transmit a request to 32-bit virtual DS 310 for the count value. At step 726, 32-bit virtual DS 310 transmits the count value to 32-bit agent DSM 300 as a return value of the call to virtual DS entry 314. At step 728, 32-bit agent DSM 300 provides the count value to 32-bit application 166 as a return value of the call to agent DSM entry 302. At step 730, 32-bit application 166 checks if the count value is zero. If the count value is nonzero, method 700 returns to step 708, and 32-bit application 166 calls agent DSM entry 302 to request another image from 32-bit agent DSM 300. Otherwise, if the count value is zero, method 700 ends.

Figure 8:
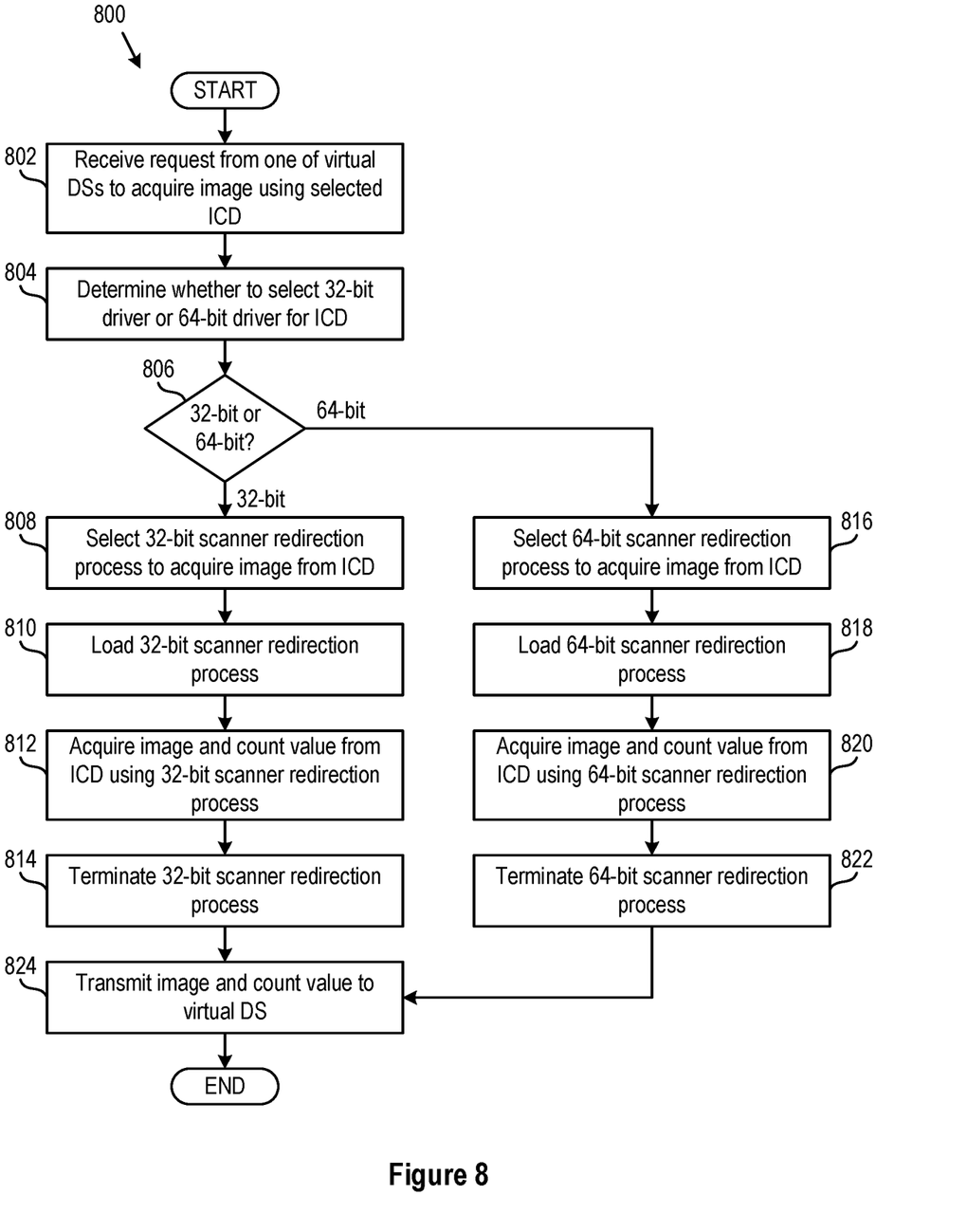
FIG. 8 is a flow diagram of a method performed by the client computer to acquire an image for the remote computer using either a 32-bit driver or a 64-bit driver, according to an embodiment.

FIG. 8 is a flow diagram of a method 800 performed by MKS process 116 to acquire an image using a 32-bit driver or a 64-bit driver, according to an embodiment. At step 802, MKS process 116 receives a request from 32-bit virtual DS 310 or 64-bit virtual DS 330 via a TCP or UDP channel between client RDPVCB plugin 284 and agent RDPVCB plugin 340. The request is to acquire an image using a selected ICD, the request including the name of the ICD.

At step 804, MKS process 116 determines whether to select a 32-bit driver or a 64-bit driver for communicating with the selected ICD. If there is only a single driver installed in client computer 110 for the ICD, MKS process 116 determines to use the installed driver. On the other hand, if there is both a 32-bit driver and 64-bit driver for the ICD, MKS process 116 determines whether 32-bit or 64-bit drivers are prioritized, e.g., by checking a registry key. If 32-bit drivers are prioritized, MKS process 116 determines to use the 32-bit driver, and if 64-bit drivers are prioritized, MKS process 116 determines to use the 64-bit driver.

At step 806, if MKS process 116 determined to use a 32-bit driver, method 800 moves to step 808. At step 808, MKS process 116 selects 32-bit scanner redirection process 118 to acquire the image from the ICD. At step 810, MKS process 116 loads 32-bit scanner redirection process 118 into memory of hardware platform 130. At step 812, MKS process 116 acquires an image and count value from the ICD using 32-bit scanner redirection process 118, as explained further below in conjunction with FIG. 9. At step 814, MKS process 116 terminates 32-bit scanner redirection process 118.

Returning to step 806, if MKS process 116 determined to use a 64-bit driver, method 800 moves to step 816. At step 816, MKS process 116 selects 64-bit scanner redirection process 120 to acquire the image from the ICD. At step 818, MKS process 116 loads 64-bit scanner redirection process 120 into memory of hardware platform 130. At step 820, MKS process 116 acquires an image and count value from the ICD using 64-bit scanner redirection process 120, as explained further below in conjunction with FIG. 9. At step 822, MKS process 116 terminates 64-bit scanner redirection process 120. At step 824, MKS process 116 transmits the image and count value acquired at either step 812 or 820, to either 32-bit virtual DS 310 or 64-bit virtual DS 330 (whichever requested the image at step 802) via the TCP or UDP channel. After step 824, method 800 ends.

Figure 9:
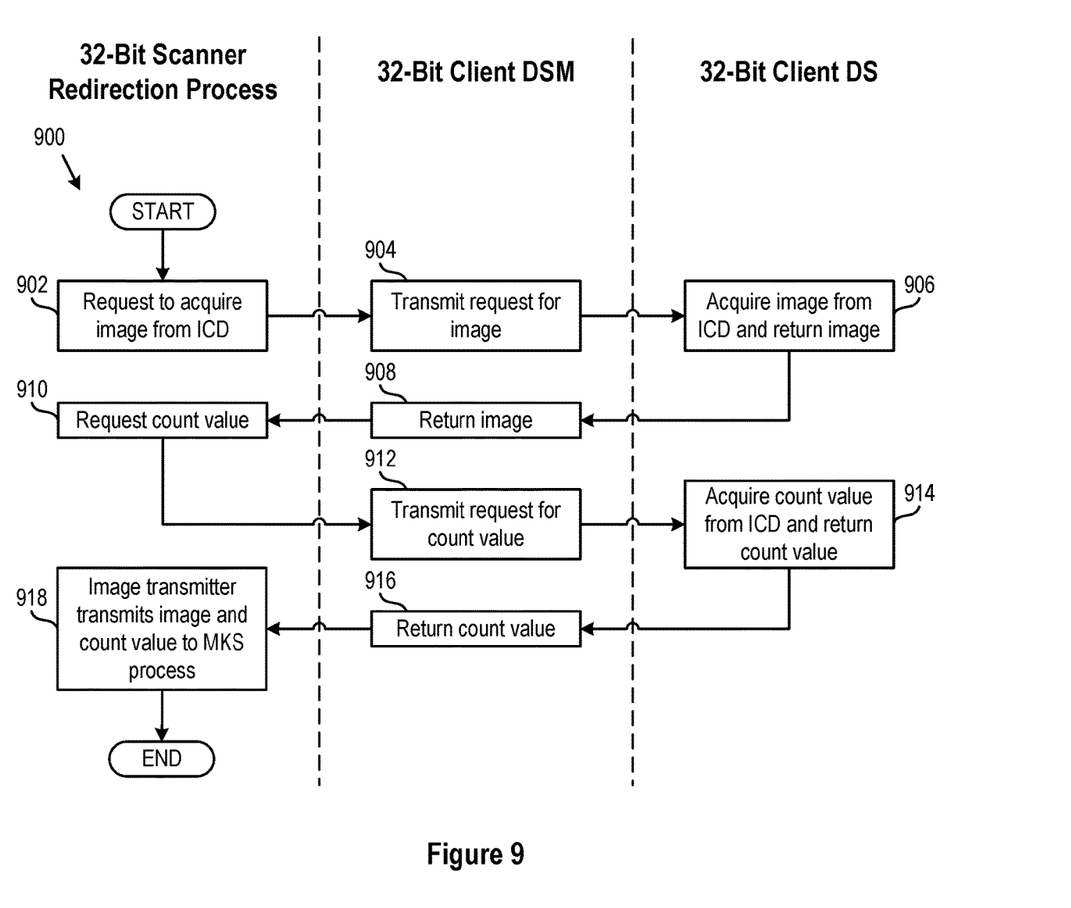
FIG. 9 is a flow diagram of a method performed by the client computer to acquire an image for the remote computer based on a selected driver, according to an embodiment.

FIG. 9 is a flow diagram of a method 900 performed by client computer 110 to acquire an image for VM 164-1 based on a selected driver, according to an embodiment. Method 900 will be discussed with respect to 32-bit scanner redirection process 118. However, method 900 is instead performed by 64-bit scanner redirection process 120 if the selected driver is a 64-bit driver. If performed by 64-bit scanner redirection process 120, steps performed by 32-bit client DSM 210 and a 32-bit client DS are instead performed by 64-bit client DSM 250 and a 64-bit client DS. Additionally, method 900 will be discussed with respect to flatbed scanner 290. However, method 900 may be performed for any ICD selected for acquiring an image.

At step 902, 32-bit scanner redirection process 118 calls client DSM entry 212 to request 32-bit client DSM 210 to acquire an image from flatbed scanner 290. At step 904, 32-bit client DSM 210 calls client DS entry 222 to transmit a request to 32-bit client DS 220 for the image. At step 906, 32-bit client DS 220 communicates with a 32-bit driver to acquire the image from flatbed scanner 290 and transmits the image to 32-bit client DSM 210 as a return value of the call to client DS entry 222. At step 908, 32-bit client DSM 210 provides the image to 32-bit scanner redirection process 118 as a return value of the call to client DSM entry 212. At step 910, 32-bit scanner redirection process 118 calls client DSM entry 212 to request 32-bit client DSM 210 for a count value.

At step 912, 32-bit client DSM 210 calls client DS entry 222 to transmit a request to 32-bit client DS 220 for the count value. At step 914, 32-bit client DS 220 acquires the count value from flatbed scanner 290 and returns the count value to 32-bit client DSM 210 as a return value of the call to client DS entry 222. At step 916, 32-bit client DSM 210 provides the count value to 32-bit scanner redirection process 118 as a return value of the call to client DSM entry 212. At step 918, image transmitter 240 of 32-bit scanner redirection process 118 transmits the image and count value to MKS process 116. After step 918, method 900 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer-readable media. The term computer-readable medium refers to any data storage device that can store data that can thereafter be input into a computer system. Computer-readable media may be based on any existing or subsequently developed technology that embodies computer programs in a manner that enables a computer to read the programs. Examples of computer-readable media are magnetic drives, SSDs, network-attached storage (NAS) systems, read-only memory (ROM), RAM, compact disks (CDs), digital versatile disks (DVDs), magnetic tapes, and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest OS that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A scanner redirection method for a remote desktop computer system, wherein the remote desktop computer system includes a client computer and a remote computer, and wherein the client computer and the remote computer are each configured to execute remote desktop software, the scanner redirection method comprising:
receiving a request from an application installed on the remote computer to acquire an image from an image capturing device using a driver that has been selected for communicating with the image capturing device;
selecting a scanner redirection process based on a selection of the driver and loading the scanner redirection process, which is to be used in communicating with the selected driver to acquire the image from the image capturing device, wherein said selecting includes selecting an m-bit scanner redirection process in response to the selected driver being an m-bit driver or selecting an n-bit scanner redirection process in response to the selected driver being an n-bit driver, where m is not equal to n; and
upon acquiring the image using the selected scanner redirection process and the selected driver, transmitting the image to the application.

2. The scanner redirection method of claim 1, wherein the m-bit scanner redirection process and the n-bit scanner redirection process are a 32-bit scanner redirection process and a 64-bit scanner redirection process, respectively, and wherein the m-bit driver and the n-bit driver are a 32-bit driver and a 64-bit driver, respectively.

3. The scanner redirection method of claim 1, wherein an m-bit data source of the m-bit scanner redirection process communicates with the m-bit driver to control the image capturing device, or an n-bit data source of the n-bit scanner redirection process communicates with the n-bit driver to control the image capturing device.

4. The scanner redirection method of claim 3, wherein an m-bit data source manager of the m-bit scanner redirection process requests the m-bit data source to acquire the image, or an n-bit data source manager of the n-bit scanner redirection process requests the n-bit data source to acquire the image.

5. The scanner redirection method of claim 1, further comprising:
creating a list of image capturing devices including image capturing devices corresponding to the m-bit driver and the n-bit driver.

6. The scanner redirection method of claim 5, further comprising:
transmitting the list of image capturing devices to the remote computer; and
displaying an image received from the remote computer, wherein the image received from the remote computer shows the list of image capturing devices.

7. The scanner redirection method of claim 5, further comprising:
in response to determining that m-bit drivers have been selected to be prioritized over n-bit drivers, creating the list of image capturing devices to identify an image capturing device corresponding to the m-bit driver before identifying an image capturing device corresponding to the n-bit driver.

8. A non-transitory computer-readable medium comprising instructions that are executable in a remote desktop computer system, wherein the instructions when executed cause the remote desktop computer system to carry out a scanner redirection method, the remote desktop computer system including a client computer and a remote computer, the client computer and the remote computer each being configured to execute remote desktop software, and the scanner redirection method comprising:
receiving a request from an application installed on the remote computer to acquire an image from an image capturing device using a driver that has been selected for communicating with the image capturing device;
selecting a scanner redirection process based on a selection of the driver and loading the scanner redirection process, which is to be used in communicating with the selected driver to acquire the image from the image capturing device, wherein said selecting includes selecting an m-bit scanner redirection process in response to the selected driver being an m-bit driver or selecting an n-bit scanner redirection process in response to the selected driver being an n-bit driver, where m is not equal to n; and
upon acquiring the image using the selected scanner redirection process and the selected driver, transmitting the image to the application.

9. The non-transitory computer-readable medium of claim 8, wherein the m-bit scanner redirection process and the n-bit scanner redirection process are a 32-bit scanner redirection process and a 64-bit scanner redirection process, respectively, and wherein the m-bit driver and the n-bit driver are a 32-bit driver and a 64-bit driver, respectively.

10. The non-transitory computer-readable medium of claim 8, wherein an m-bit data source of the m-bit scanner redirection process communicates with the m-bit driver to control the image capturing device, or an n-bit data source of the n-bit scanner redirection process communicates with the n-bit driver to control the image capturing device.

11. The non-transitory computer-readable medium of claim 10, wherein an m-bit data source manager of the m-bit scanner redirection process requests the m-bit data source to acquire the image, or an n-bit data source manager of the n-bit scanner redirection process requests the n-bit data source to acquire the image.

12. The non-transitory computer-readable medium of claim 8, wherein the scanner redirection method further comprises:
creating a list of image capturing devices including image capturing devices corresponding to the m-bit driver and the n-bit driver.

13. The non-transitory computer-readable medium of claim 12, wherein the scanner redirection method further comprises:
transmitting the list of image capturing devices to the remote computer; and
displaying an image received from the remote computer, the image received from the remote computer showing the list of image capturing devices.

14. The non-transitory computer-readable medium of claim 12, wherein the scanner redirection method further comprises:
in response to determining that m-bit drivers have been selected to be prioritized over n-bit drivers, creating the list of image capturing devices to identify an image capturing device corresponding to the m-bit driver before identifying an image capturing device corresponding to the n-bit driver.

15. A remote desktop computer system comprising:
a remote computer configured to execute remote desktop software; and
a client computer configured to execute remote desktop software on a processor of a hardware platform, wherein the remote desktop software at the client computer is configured to:
receive a request from an application installed on the remote computer to acquire an image from an image capturing device using a driver that has been selected for communicating with the image capturing device;
select a scanner redirection process based on a selection of the driver and load the scanner redirection process, which is to be used in communicating with the selected driver to acquire the image from the image capturing device, wherein said selecting includes selecting an m-bit scanner redirection process in response to the selected driver being an m-bit driver or selecting an n-bit scanner redirection process in response to the selected driver being an n-bit driver, where m is not equal to n; and
upon acquiring the image using the selected scanner redirection process and the selected driver, transmit the image to the application.

16. The remote desktop computer system of claim 15, wherein the m-bit scanner redirection process and the n-bit scanner redirection process are a 32-bit scanner redirection process and a 64-bit scanner redirection process, respectively, and wherein the m-bit driver and the n-bit driver are a 32-bit driver and a 64-bit driver, respectively.

17. The remote desktop computer system of claim 15, wherein an m-bit data source of the m-bit scanner redirection process communicates with the m-bit driver to control the image capturing device, or an n-bit data source of the n-bit scanner redirection process communicates with the n-bit driver to control the image capturing device.

18. The remote desktop computer system of claim 17, wherein an m-bit data source manager of the m-bit scanner redirection process requests the m-bit data source to acquire the image, or an n-bit data source manager of the n-bit scanner redirection process requests the n-bit data source to acquire the image.

19. The remote desktop computer system of claim 15, wherein the remote desktop software at the client computer is further configured to:
   create a list of image capturing devices including image capturing devices corresponding to the m-bit driver and the n-bit driver.

20. The remote desktop computer system of claim 19, wherein the remote desktop software at the client computer is further configured to:
   transmit the list of image capturing devices to the remote computer; and
   display an image received from the remote computer, wherein the image received from the remote computer shows the list of image capturing devices.

\* \* \* \* \*